(12) United States Patent
Harman

(10) Patent No.: US 6,970,991 B2
(45) Date of Patent: Nov. 29, 2005

(54) COMPUTER SYSTEM WITH VIRTUAL MEMORY AND PAGING MECHANISM

(75) Inventor: Philip Harman, Flintshire (GB)

(73) Assignee: Sun Microsystems, Inc., Santa Clara, CA (US)

( * ) Notice: Subject to any disclaimer, the term of this patent is extended or adjusted under 35 U.S.C. 154(b) by 401 days.

(21) Appl. No.: 10/241,178

(22) Filed: Sep. 11, 2002

(65) Prior Publication Data

US 2003/0088752 A1   May 8, 2003

(30) Foreign Application Priority Data

Nov. 7, 2001 (GB) .................................. 0126769

(51) Int. Cl.[7] .............................................. G06F 12/10
(52) U.S. Cl. .................................. 711/206; 711/209
(58) Field of Search ........................ 711/203, 206–209

(56) References Cited

U.S. PATENT DOCUMENTS

| | | | | |
|---|---|---|---|---|
| 5,237,668 A | * | 8/1993 | Blandy et al. ................... | 711/2 |
| 5,784,707 A | * | 7/1998 | Khalidi et al. ............... | 711/206 |
| 5,923,882 A | * | 7/1999 | Ho et al. ..................... | 717/147 |
| 6,154,877 A | * | 11/2000 | Ramkumar et al. .......... | 717/114 |
| 6,604,184 B2 | * | 8/2003 | Zahir et al. .................. | 711/207 |
| 6,772,302 B1 | * | 8/2004 | Thompson ................... | 711/162 |

FOREIGN PATENT DOCUMENTS

| | | |
|---|---|---|
| EP | 0562617 | 9/1993 |
| EP | 0663636 A1 * | 7/1995 |

OTHER PUBLICATIONS

International search report application No. GB0126769.9 mailed Dec. 4, 2003.
Solaris™ Internals—Core Kernel Architecture, Mauro, et al, Prentice Hall, Sun Microsystems, Inc., Palo Alta, CA, 2001, Ch. 5, pp. 125-203, ISBN 0-13-022496-0.

* cited by examiner

*Primary Examiner*—Tuan V. Thai
*Assistant Examiner*—Hetul Patel
(74) *Attorney, Agent, or Firm*—Meyertons Hood Kivlin Kowert & Goetzel, P.C.; B. Noël Kivlin

(57) ABSTRACT

A computer system supports virtual memory and a paging mechanism. When a new process is created, this occupies one or more memory region. In one embodiment, at least a first memory region occupied by the process at a first virtual address has predefined, fixed, page characteristics (for example page size). It turns out that these are not optimum for the performance of the process. In order to address this, a routine in a shared library is invoked to copy the component from the first memory region into a second memory region. The second memory region either has different page characteristics from the first memory region (for example, a different page size), or is modifiable to have such different page characteristics. The second memory region is reallocated in virtual memory so that it replaces the first memory region at the first virtual address. The overall consequence of this is that at least one component of the process can now operate at a more suitable page characteristic (such as page size), thereby leading to improved performance.

44 Claims, 7 Drawing Sheets

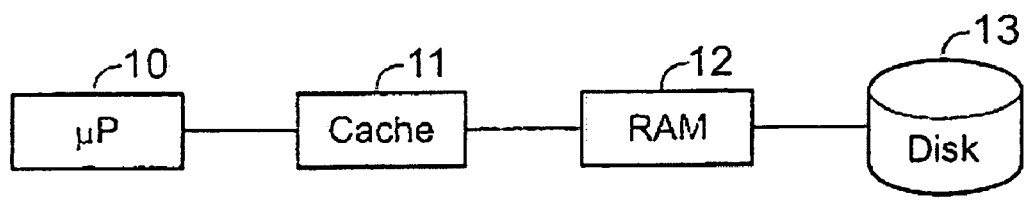
Fig. 1 - Prior Art
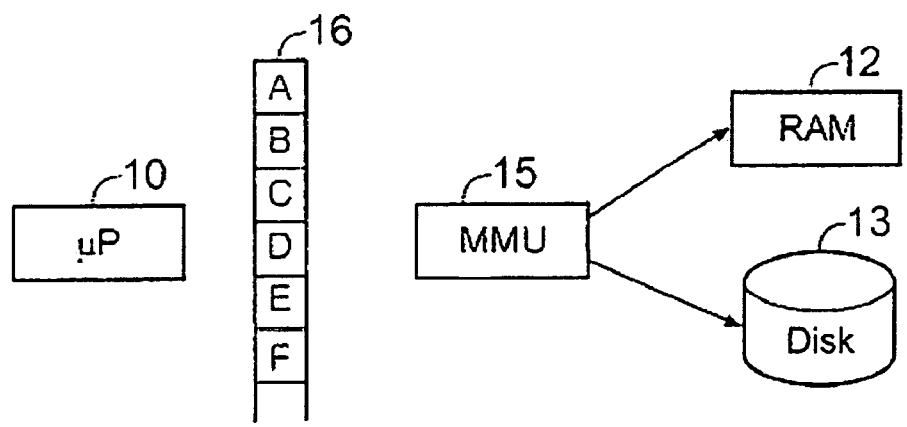
Fig. 2 - Prior Art
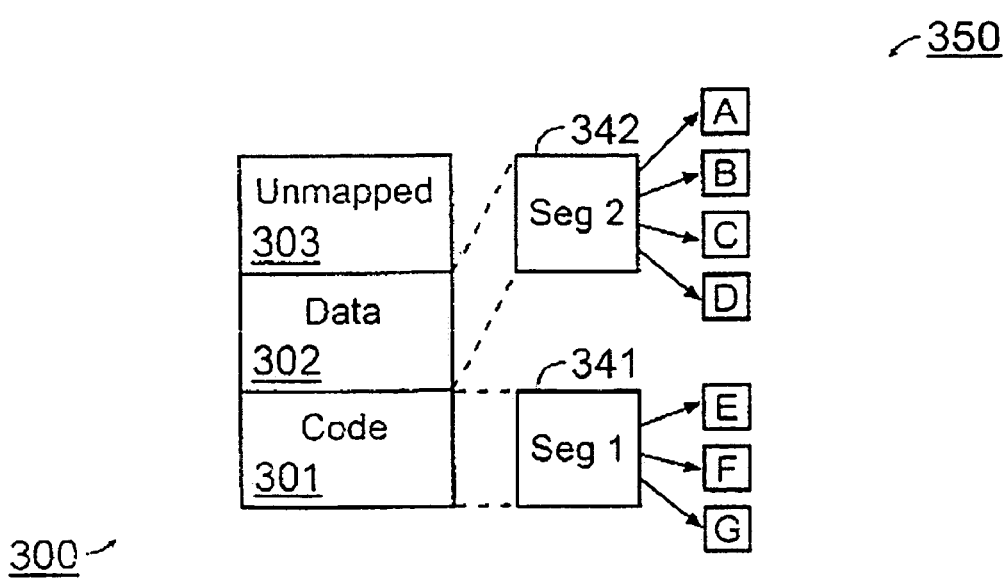
Fig. 3 - Prior Art

COMPUTER SYSTEM WITH VIRTUAL MEMORY AND PAGING MECHANISM

FIELD OF THE INVENTION

The present invention relates to a computer system supporting virtual memory and a paging mechanism, and in particular to the ability to dynamically modify paging characteristics for a selected portion of memory.

BACKGROUND OF THE INVENTION

In computer memory there is generally a trade-off between capacity and speed of access. Thus for a given cost it is possible to make a memory that either allows quick retrieval of data, or that can store a large quantity of data, but not both (naturally some intermediate compromise solution can also be achieved).

As a reflection of the above limitations, modern computer systems have usually adopted a hierarchical memory system, typically involving at least two or three layers. An example of such a configuration is shown schematically in FIG. 1. This depicts a microprocessor 10 attached to a cache 11. Note that in many systems there may actually be a two-level cache (denoted L1 and L2). The L1 cache is typically fabricated on the same semiconductor device as the microprocessor 10 itself, and so provides very fast data access for microprocessor 10, whilst the L2 cache is a separate semiconductor storage device. The capacity of the L1 cache may be limited to say 64 Kbytes, whilst the L2 cache is larger, for example a few Mbytes.

(It will be understood that all memory sizes quoted herein are illustrative of current technology, but experience has shown that available memory sizes for both semiconductor and disk memory have increased steadily over recent years. This trend seems likely to continue in the future, but it does not impact the applicability of the present invention).

The next device in the memory hierarchy of FIG. 1 is random access memory (RAM) 12. This is also referred to by a variety of other names, such as physical memory, system memory, main memory, or internal storage. RAM 12 is implemented as a semiconductor device, but is significantly slower than cache 11 (RAM 12 and processor 10 are generally connected by at least one communications bus). However RAM 12 has a correspondingly greater capacity than cache 11, for example a few hundred Mbytes.

The final component in FIG. 1 is a hard disk drive 13. This is sometimes referred to as external storage, and provides non-volatile storage for a large volume of data, frequently tens or even hundreds of gigabytes. However, data access from a disk drive is a relatively slow process. Consider for example typical figures of a disk drive access time of 1 millisecond, compared to the 1 GHz clock rate of a modern processor. Thus, if the processor 10 has to wait for data to arrive from external storage 13, this can represent a delay of one million processor cycles.

In some prior art systems, processor 10 directly addressed data in RAM 12 (hence its name as internal storage). Modern processors however operate primarily at either 32 bits or 64-bits, which gives them a potential address space that is frequently much greater than the amount of physical or system memory that is actually installed. For example on a 32-bit system the processor can nominally address up to 4 Gbytes of memory, whereas the amount of RAM may be limited to some subset of this. The discrepancy between potential address space and actual internal memory is clearly much greater for a 64-bit system.

In order to accommodate this disparity, and also to provide increased flexibility, it is common for systems to adopt what is known as a virtual memory (VM) scheme. According to such a scheme, the addresses utilised by a processor do not directly represent hardware addresses. Rather they are virtual addresses which must be translated into real (physical) addresses in order to access the desired memory location. It is generally the responsibility of the operating system to manage this translation.

As an example of the improved flexibility provided by the use of virtual addresses, consider the storage of a large array. If physical memory is already partially occupied, there may be no single region of physical memory that can accommodate the whole array; rather it must be split across one or more different portions of physical memory. The use of virtual addressing allows this segmentation to be hidden from user programs. In other words, a contiguous set of virtual addresses can be assigned to the array, even although this corresponds to a non-contiguous set of physical addresses.

In combination with virtual addressing, it is also common to use a paging structure or mechanism. This divides the entire virtual address space into portions of predefined size, known as pages. All memory operations are then performed on whole pages, which therefore maintain their integrity throughout the system, both in terms of real and virtual address space.

In order to consider this further, assume that we have virtual addresses A and B, where A is the first address on a page, and B is offset from A by an amount C, less than the page size (in other words, A and B are on the same page as each other). Let us now denote A' as representing the real (physical) address corresponding to virtual address A, and B' as representing the real address corresponding to virtual address B. The fact that individual pages are always manipulated en bloc implies that the physical offset of B' from A' is again C (i.e. the same as in virtual address space). In other words, the structure within an individual page is the same for both real and virtual memory.

This property is frequently utilised in the system addressing structure, in that the high order bits of a virtual address can represent the virtual page number (VPN), whilst the low order bits represent an offset into this page. Address translation therefore simply becomes a question of looking up the physical start location of the VPN, and using this to form the high order bits of the physical address. The offset from the virtual address can then be passed through unchanged to provide the low order bits of the physical address.

A previously indicated, the virtual address space usually exceeds the amount of available physical memory, sometimes by a very large factor. Accordingly, only a certain proportion of pages of virtual addresses can actually be accommodated in RAM 12 at any one time. The remaining pages then have to be stored externally on disk drive 13. This is illustrated in FIG. 2, which shows processor 10 and also depicts schematically the range of virtual addresses 16 that are accessible to it. The virtual address space 16 is split into pages A, B, C, etc. (Note that cache 11 is omitted from FIG. 2, since it is not relevant at present to an understanding of the paging mechanism).

In order to convert any given virtual address into its corresponding real address, the operating system first identifies the page containing the virtual address. It then utilises a hardware device known as the memory management unit (MMU) 15 to identify the current real location of the corresponding physical page in RAM 12. Note that only the physical location of the start of the relevant page needs to be determined, since as explained above, the offset of any given address into a page is the same in both virtual and real address space.

Of course, at any given time, the desired (virtual) page may be out on disk 13 rather than in RAM 12. How this information is stored will depend on the details of the machine architecture. For example, the MMU 15 may simply have a flag to recognise if a page is not currently in RAM 12, with further details about the location of the page data on disk being stored on disk 13 itself. Another possibility is that page location information may be stored somewhere in RAM 12 (in other words MMU 15 is not specifically notified of page operations between RAM 12 and disk 13).

Processor 10 is unable to directly access data in external storage 13. Rather, any attempt to access data not currently in RAM 12 generates what is known as a page fault for the page containing the desired virtual address. This prompts the transfer of the relevant page from disk storage 13 back to internal memory (RAM 12) whereupon processor 10 can access it. Note that if RAM 12 is full when a new page must be added into it, then the system must first delete an existing page from RAM, writing back to external storage if it has been modified. This then provides space for the new page to be stored within RAM 12. There are known algorithms for deciding which particular page(s) should be removed from RAM if it becomes necessary to free up space for new pages (a typical such algorithm is based on the removing the least recently used (LRU) page or pages). The transfer of pages in and out of system memory according to the needs of the processor is controlled by the paging mechanism of the operating system. As used herein, the term "pageable" refers to data which is capable of being transferred in units of pages from primary storage (e.g., RAM) to secondary storage (e.g., swap space on a disk) and vice versa, or to memory which stores such data.

Although FIG. 2 illustrates just a single virtual address space 16, it is common in modern systems to have a multiplicity of address spaces. This arises because in multitasking (multiprocessing) systems, each process typically has its own virtual address space. Consequently, whilst page A for process 1 may be located at system address X, page A for process 2 may be located at system address Y (where X and Y may be in either internal or external storage).

Although in general it is desirable to separate the address space of each different process to avoid one process potentially corrupting data from another process, nevertheless, there can be occasions when different processes need to share or exchange data. One way of accommodating this is to provide shared memory, in which the address space of two (or more) processes both refer to the same (physical) region of memory.

A further known manner in which memory is divided is termed segmentation. This generally represents a higher organisational level than pages, and tends to reflect the type of information that is to be stored in any memory segment. Thus the simplest form of division is between a code segment and a data segment. Segmentation is useful for setting properties of memory; for example a code segment may be read only (once the code has been initially loaded into it), whereas a data segment may support read-write access. Whilst such access properties can be set at the page level, it is often more convenient to manipulate them en bloc according to the type of segment that a page belongs to.

The use of segments is shown schematically in FIG. 3, which illustrates the virtual address space 300 for a process. This contains two segments, one segment for process code 301, and one segment for process data 302. The remaining portion 303 of the virtual address space 300 is currently unmapped. Each of the two segments is effectively treated as a separate block, with code segment 301 corresponding to segment 1 (341) and data segment 302 corresponding to segment 2 (342). Each segment block then comprises one or more pages 350.

The hardware enforces different memory protection policies according to the nature of the segment. For example, any attempt to execute an "instruction" within data segment 302 would lead to an error, since this is not appropriate for this type of segment (but clearly would be permissible for code segment 301).

Returning now to the operation of cache 11, this is used to store data for processor 10. In particular, selected portions of data from RAM 12 are mirrored into cache 11 in accordance with known caching strategies (again this typically involves discarding LRU data from the cache). Note that the cache does not necessarily mirror whole pages of data, but rather just selected lines of a page. However, data within the cache is aligned so as to maintain page offsets. Thus if the page size is 4 Kbytes (page size is discussed in more detail below), then the first line of a page will be stored in the cache on a 4 Kbytes boundary; likewise if a virtual address is offset by 3 Kbytes into a 4 Kbytes page, then the cache line for that virtual address will be offset by 3 Kbytes from a 4 Kbytes boundary within the cache. This approach helps to enable the consistent use throughout the system of the page offset component of a virtual address (as described above).

It will be appreciated that since processor 10 utilises virtual addresses, the translation from a virtual address to the corresponding real (physical) address be performed as quickly as possible so as to provide the processor with fast access to the desired data. Many systems therefore provide a translation lookaside buffer (TLB), which effectively acts as a special purpose hardware cache for translation information from MMU 15. However, as with all memory systems there is a trade-off between speed and capacity, and although TLB is fast, the number of (most recent) translations that it can hold is limited. Thus if the processor tries to access a virtual address which cannot be resolved (mapped) by an entry in the TLB, then it must go to MMU 15. If this occurs too frequently, it will have a negative impact on performance.

Note that the systems described so far are exemplary only, and many variations and modifications of them are known to the skilled person, according to the particular machine architecture and operating environment being utilised. Some of the relevant design considerations are discussed in: "Computer Architecture: a designer's text based on a generic RISC" by James Feldman and Charles Retter, McGraw-Hill, 1994 (ISBN 0-07-113318-6).

Returning now to the question of TLB misses occurring because a processor has been unable to locate a desired virtual address in the TLB, it has been found that such a problem is particularly prone to arise in relation to certain very large application programs (such as an enterprise database). Thus such a program can occupy some 20 Mbytes of storage. Assuming a page size of 8 Kbytes, such a program will then extend over 2560 pages, which can easily be more than the number of lines in the TLB (a typical system may for example provide 512 lines in the TLB). There is likewise a tendency for such programs to access very large data structures, which will extend over a significant number of pages, and will again tend to overflow the TLB.

Consequently, system performance for such large applications can suffer a degradation in performance due to the delays caused by having to access portions of the page table not currently stored in the TLB (this can be regarded as poor scalability to larger applications).

One way in principle to mitigate this is to use a larger page size. This has the effect of allowing a greater region of memory to be represented by the fixed set of pages that can be stored within the TLB. In other words, the overall number of pages that need to be referenced should be reduced, and consequently, a greater proportion of their address translations can be retained in the TLB. This should in turn reduce the number of TLB misses, and improve system performance in this respect.

However, simply increasing the page size for the whole system has its own drawbacks. For example, having a large page size effectively increases the granularity of memory, which can lead to wastage and inefficiency. Thus if we have a page size as large as 4 Mbytes, then this is the minimum that can be allocated to a process, even if the process only needs a small fraction of this. There can also be delays in that any paging operation, such as writing to or from disk, now involves the manipulation of 4 Mbytes, compared to say 4 or 8 Kbytes if a smaller page size were used.

A more subtle problem can also be caused by the use of a large page size. To understand this, let us assume that the page size matches the size of the cache, which in turn implies that an address having page offset K must always be stored at offset K. Now let us imagine a database program manipulating multiple records, each of which is aligned on a page boundary. In these circumstances, there may be one particular field of the records which is of interest to the program, and let us say that this field is at offset K from the start of the record (and hence the start of the page). Consequently, each time this field is accessed in one record and stored in the cache (at offset K), it will need to overwrite any cache entry for the same field from a different record (which would also have to be stored at offset K). This is known as a cache collision.

Note that in these circumstances the effective capacity of the cache has been greatly reduced, since although the cache can in theory store multiple lines, each access to field K at a new record will produce a cache miss. The corresponding delay to access the relevant data will lead to a degradation of processor throughput.

It will therefore be seen that simply increasing the page size (if possible) for the whole system is an unattractive approach to the problem of TLB misses for large application programs. Rather some other strategy must be adopted to maintain the desired level of performance.

SUMMARY OF THE INVENTION

Accordingly, the present invention provides a method for operating a computer system supporting virtual memory and a paging mechanism. The method starts with the creation of a process in memory. The process includes at least one component in a first memory region located at a first virtual address and having a first paging characteristic. Next a copy is made of the least one component, and then the first memory region is replaced at the first virtual address with a second memory region having a second paging characteristic. A copy of the at least one component is stored in the second memory region having the second paging characteristic.

The outcome of such a procedure is that at least part of the process is now stored at a location having the second paging characteristic (or characteristics). This in turn can lead to improved performance for the process, and is particularly useful for circumventing limitations of the paging mechanism itself. Note that the part of the process affected may for example be code and/or data, or some shared library, accessible to multiple processes.

In one implementation the copy of the at least one component is made directly into the second memory region, which has already been attached to a second virtual address of the process. The replacement of the first memory region at the first virtual address with the second memory region is then implemented by detaching the second memory region from the second virtual address and attaching the second memory region to the first virtual address.

Alternatively, if it is not possible to directly relocate the second memory region in virtual address space, then an intermediate copying step is employed, in order to preserve the data whilst the first memory region is detached or deleted. More particularly, the at least one component is copied into a third memory region having a virtual address different from the first virtual address. The at least one component is then copied back from the third memory region into the second memory region after the latter has replaced the first memory region at the first virtual address. This can be followed by deletion of the third memory region, which is now no longer required.

In one embodiment, the paging characteristic that varies between the first and second memory regions comprises page size. More particularly, the second memory region is created having a substantially larger page size than said first memory region, thereby reducing the possibility of a TLB miss.

In a particular embodiment, the first memory region comprises one or more memory segments, such as program text (code), data, and/or the heap, which are typically created having predetermined (and unchangeable) paging characteristics. In this embodiment, the second memory region is created in a different form of segment (shared memory), which does permit a larger page size.

In the current implementation, the procedure to (partly) reallocate a process to a memory region having different paging characteristics is performed prior to the main body of process code itself. This firstly ensures that the process is in a fixed state when copied, and secondly prevents any attempt to execute the process during the procedure (when it may be in a deconstructed and unviable state). The procedure is provided in a shared library which is dynamically linked to said process at run-time. Thus the reallocation does not need any modification to the operating system or application process itself, and so is fully compatible with existing code.

Note that it is also feasible to perform the reallocation procedure after the process has started execution, provided that the process is first suitably quiesced. In this case the procedure can be implemented for example either by an external utility (such as via a debugging interface) or from within the application program containing the process.

The invention further provides a computer system and computer program product for implementing the above approach. It will be appreciated that in general these will benefit from the same preferred features as the method of the invention.

BRIEF DESCRIPTION OF THE DRAWINGS

Various embodiments of the invention will now be described by way of example with reference to the drawings, which are summarised below:

FIG. 1 is a simplified representation of a known memory hierarchy;

FIG. 2 is a schematic representation of a known virtual memory system;

FIG. 3 is a schematic representation of segmentation in a known virtual memory system;

DETAILED DESCRIPTION

FIGS. 4A through 4F illustrate in detail the steps involved in re-mapping a process in accordance with one particular embodiment of the present invention. In this particular embodiment, the re-mapping is performed on a large-scale server machine running the Solaris operating system (trademark of Sun Microsystems Inc.), which provides a UNIX environment. Further details of this environment, and some of the facilities used in this embodiment, can be found in the book "Solaris Internals" by Mauro and McDougall, Prentice Hall, ISBN 0-13-022496-0. (It is assumed that the reader of the present specification is generally familiar with the contents of this book). Nevertheless, it will be appreciated that the teachings of the invention can be readily applied to other environments and machine architectures (mainframes, minicomputers, client devices, workstations, laptops, embedded systems, parallel or distributed systems, and so on).

In addition, the implementation described below is based on a series of computer program operations. In a current embodiment these are controlled by computer program code or instructions, which are loaded into a computer processor from a storage medium, such as a CD ROM, DVD or floppy disk (optionally via a hard disk drive), or may be transferred to the computer over a network such as the Internet. Alternatively, they may be preinstalled onto a computer system at manufacture. It will be recognised that in other embodiments, the implementation may instead be based on hardware devices rather than software, or a combination of hardware and software components, including potentially microcode, firmware, etc.

Figure 4A:
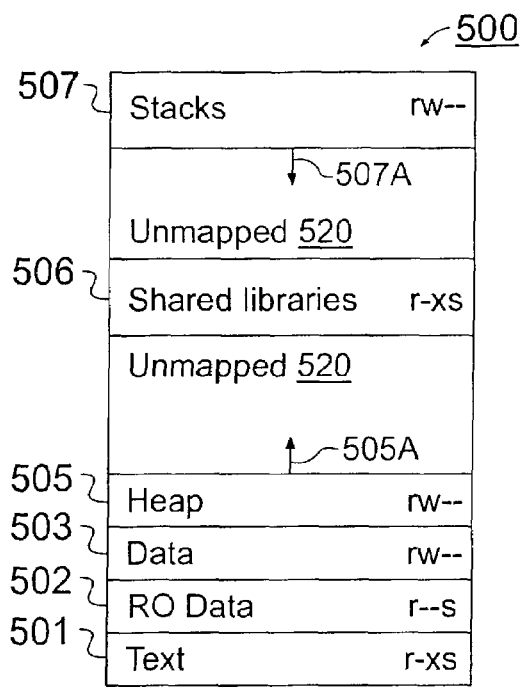
FIGS. 4A through to 4F illustrate the stages involved in reallocating process code into shared memory in accordance with one embodiment of the present invention.

Referring now to FIG. 4A, this illustrates the virtual address space 500, some of which has been allocated to various segments, whist the remaining portion 520 is currently unallocated. In this particular embodiment, the process comprises six segments (although other machine architectures and operating systems may have somewhat different segments).

Associated with each segment is a set of permissions that control four potential actions in relation to the segment. These are denoted by "r", "w", "s" and "x", and have the following meanings (as well-known in the UNIX environment). Thus "r" indicates that the segment can be read, "w" indicates that it can be written to, and "x" indicates that it can be executed (in other words, that it comprises program code). Lastly, an "s" indicates that the segment can be shared with other processes. Note that the type of operations that other (sharing) processes can perform is also governed by the remaining three permissions, so that a segment with both "w" and "s" permissions can be written to or modified by multiple processes.

Considering now the six different segments of the process in more detail, these are as follows:

Text: This represents the actual program code 501. The "r" indicates that the code can be read, whilst the x confirms that it can be executed. However, there is no "w" (write) permission for the code. In other words it cannot be modified, but is effectively read-only. Consequently, it can be safely shared with other processes that may wish to access it (for example to execute the same program code), as indicated by the final "s" (share) permission.

RO data: Associated with the program is certain read only data 502, for example, predefined constants. The permissions associated with this data are "r", to indicate that it can be read, and "s", to denote that it is shared (it is again safe to do this because other processes are not allowed to modify it). Note that the "w" and "x" permissions are absent. This is firstly because as read-only data it is not possible to update or otherwise write to this data. Furthermore, since this is data rather than code, it is not possible to execute it, hence the absence of the "x" permission.

Data: This region 503 is used for storing the data required for program variables. For this reason it can be both read from and written to as the variables are updated and the utilised, hence the presence of the "r" and "w" permissions. There is no "x" permission since this is not executable code, and also there is no "s" permission because the data cannot be shared. The latter restriction is necessary, otherwise the program could set a particular variable to a desired value for subsequent processing, only to have it then altered by a different process. Note that in the current implementation, this segment is actually divided into two different segments, one being used for storing uninitialised data such as arrays. However, for simplicity these two segments are shown as one in FIG. 4, since they can be treated together for present purposes.

Heap: The heap 505 is a further region of memory utilised by the process and represents memory space which the program can dynamically acquire for particular purposes, for example by using the malloc ("memory allocate") library function in the C programming language. In other words is not used for storing initially allocated program variables, but rather represents an area of memory that can be provided to a program in response to a specific request for a storage area. This may be used for example when processing incoming data from some external facility such as a communications network. Since it is effectively another region for program data, the heap has "r" and "w" permissions, similar to region 503.

Heap 505 does not have a fixed size, but will expand upwards as necessary according to program requests for memory space. Thus it starts off at a relatively small size (which may be user-configurable), but will be grown by the operating system as required in the direction of arrow 505A. On the other hand, the operating system does not generally try to shrink the heap, even when memory in it is released by the program. This is because the freed memory is normally fragmented over the heap, rather than being presented in any nice order.

Stack: in general terms, the stack 507 is used to hold temporary program data relating to the progress of execution. More particularly, at each new function call, the stack 507 is used to retain information concerning the status of the calling function. This then allows the program to properly return there once the called function has completed. As for the other regions that hold program work data for process 510, the stack likewise has "r" and "w" permissions.

As a consequence of its function, the stack may increase in size, depending on the course of program execution. In particular, the stack will grow larger if there is a sequence of heavily nested function calls, since in this case a lot of return information must be maintained simultaneously. Note that stack 507 is arranged to grow downwards into the unoccupied region of memory 520, as indicated by arrow 507A. In other words, heap 505 and stack 507 grow in opposite directions into vacant memory 520.

One complication is that if process 510 supports multiple threads, then they each have their own stack (the other components of process 510 are shared between threads from the same process). Thus stack region 507 may in fact have to accommodate multiple stacks, each capable of growing depending on the execution status of the various threads. Typically in such circumstances the stack region may then continue below the shared libraries 506. However, further details of how such multiple stacks are arranged within the virtual address space are omitted here, since they are not relevant to an understanding of the present invention.

Shared Libraries: these libraries 506 are dynamically linked into the program code 501 at run-time, and provide various facilities to the program (they are the equivalent of DLLs in a Windows environment). Note that some of the shared libraries are effectively standard, provided by the operating system (typically including Input/Output routines for C programs), whilst others can be supplied by a user or a third party vendor. The permissions associated with the shared libraries are the same as for the program code itself (i.e. "r", "x" and "s"), to allow the libraries to be read and executed, and also shared by other users.

It will be appreciated that shared libraries can themselves be formed from their own set of segments (not shown in FIG. 4). In particular, they may for example include a program text segment, a data segment and so on. As described in more detail later on, a consequence of this is that the re-mapping applied to the process of FIG. 4 or 5 could also be applied to the various components within a shared library.

When a process is created, it is allocated the memory segments shown in FIG. 4A. (Note that FIG. 4A is schematic only, and the different segments are not intended to be to scale with one another). In the current embodiment these segments utilise paging characteristics that are pre-determined by the operating system; in particular it is fixed that the page size to be used for a process is 8 Kbytes (for all the segments of FIG. 4A).

However, as previously described, there may be circumstances where this page size proves to be inconveniently small. Thus if the process is part of a very large application, then the limited 8 Kbytes small page size may lead to a significant number of misses to the TLB, and this in turn will adversely impact overall system performance. Furthermore, in this embodiment, there is no native facility within the operating system for directly changing the page size once the memory has been allocated to a process.

Figure 4B:
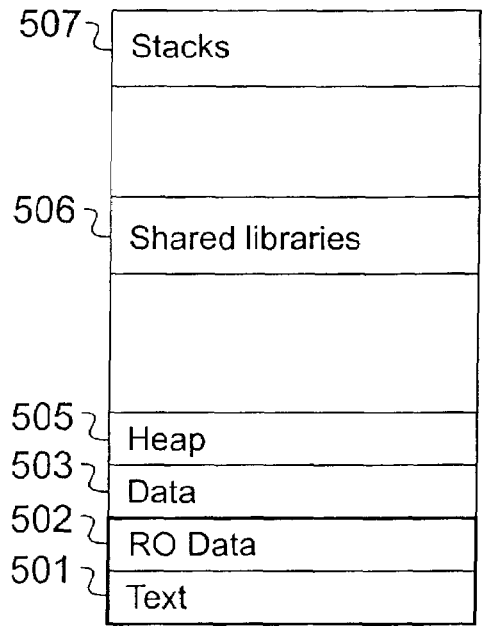

In order to address this situation, the present embodiment supports a process reallocation mechanism which has the effect of allowing the page size assigned to at least a portion of a process to be increased or otherwise altered. The various stages of this reallocation mechanism are illustrated in FIGS. 4B through to 4F. Note that the processing of FIGS. 4B–F is carried out under the control of a shared library function, as will be described in more detail below.

Starting now with FIG. 4B, this depicts the same process as in FIG. 4A, but with the program text (i.e. code) 501 and associated read-only data 502 highlighted. It is these two sections that will have their page characteristics altered. (Note that for clarity certain details from FIG. 4A have been omitted from FIG. 4B).

Figure 4C:
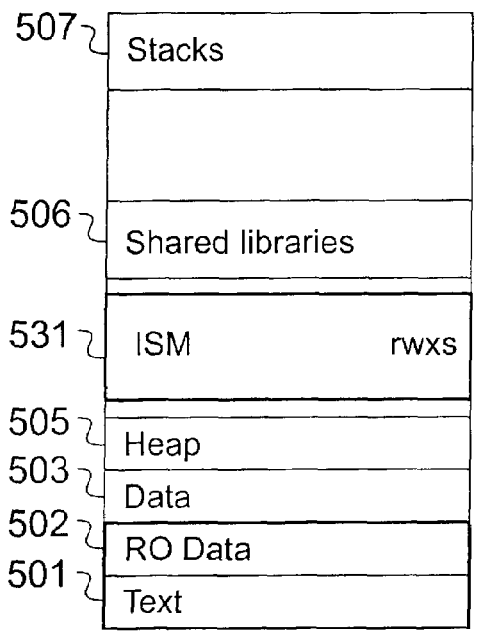

Moving onto FIG. 4C, this depicts the creation of a segment of Intimate Shared Memory (ISM) 531. ISM is a facility supported by the Solaris operating system that provides shared memory to processes. This segment is automatically allocated "r", "w", "x" and "s" permissions. Of these, the "s" permission reflects the shared nature of the segment, whilst the other three permissions provide full flexibility as regards the use of the segment. The "intimate" in the term ISM reflects the fact that certain paging structures that relate to an ISM segment can be shared between the various processes that utilise the ISM segment (rather than being replicated, one for each process). This has the effect of allowing faster switching between the different processes. However, this particular aspect of ISM is not directly relevant to the operation of the present invention, and so will not be described further.

Rather, an important aspect of ISM for present purposes is that it supports large page sizes of 4 Mbytes (in this embodiment), and accordingly, ISM segment 531 in FIG. 4C is created with this large page size. Note also that ISM segment 531 exactly matches text 501 and read-only data 502 in size (with a certain caveat regarding page alignment as discussed further below).

Looking at the creation of ISM segment 531 in more detail, this is actually a two-stage process. In a first operation, using the library function shmget( ), the relevant segment is created in physical memory by the operating system, and the id returned to the requesting program. This id provides a handle whereby a process can manipulate segment 531, although the segment is not yet in the virtual address space of the process. (Likewise, any other processes that are aware of the relevant id could also manipulate ISM segment 531).

The process then requests the operating system to attach ISM segment 531 to its virtual address space (identifying ISM segment by the id mentioned above). Note that if, as here, the process does not specify any particular location for ISM segment, the operating system will choose some suitable position from the unoccupied region 520 of the address space of the process. This leads to the situation shown in FIG. 4C.

Figure 4D:
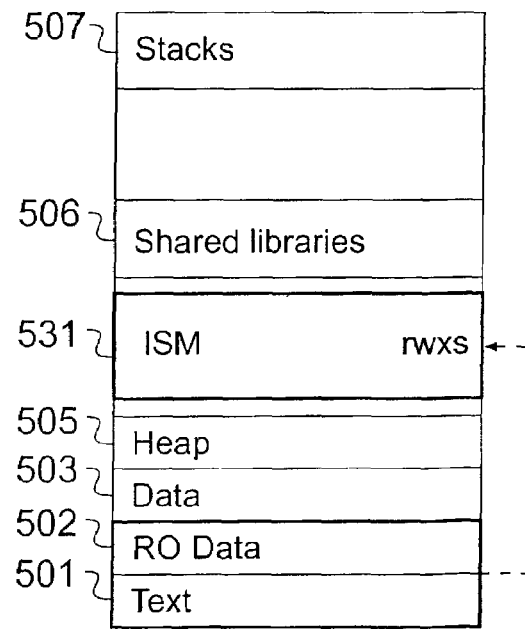

Progressing now onto FIG. 4D, this illustrates the highlighted portion from FIG. 4B, comprising the program code 501 and associated read-only data 502, being copied from its original location into the ISM segment 531. This can be achieved by any suitable programming command (e.g. bcopy in the C programming language to provide a bytewise copy). Thus ISM segment is no longer empty, but now contains a duplicate of segments 501 and 502. Note however that the permissions associated with ISM segment 531 do not correspond exactly to the original permissions associated with the program code 501 and read-only data 502.

Figure 4E:
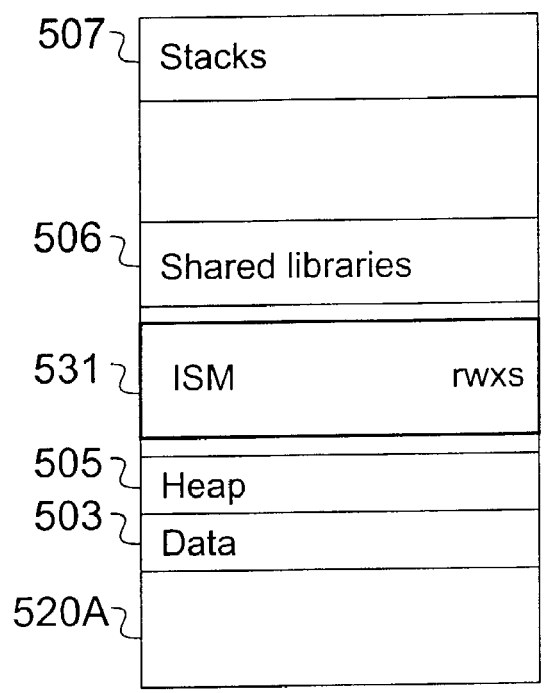

The next operation is depicted in FIG. 4E, where the original program text segment 501 and read only text segment 502 are unmapped from the process virtual address space. Thus the space 520A formerly occupied by these two segments now becomes unallocated (like region 520). This can be regarded as a somewhat exposed situation, since any attempt to perform a program instruction or utilise the read-only detail will not find anything at the relevant virtual address (and so will fail). However, as long as processing is under the control of a routine in a shared library 506, then the (temporary) absence of the program code itself can be tolerated. This will be discussed in more detail below.

Note that although program code 501 and read only data 502 have been unmapped from the virtual address space of the process, it does not follow that they are automatically deleted, since they are still retained in physical memory. In particular, it is possible that they are currently being referenced by another process (in view of the shared permission for them). Unmapping these segments from the virtual address space of this process will not impact their operation or utilisation by another process. On the other hand, if program code 501 and read only data 502 are not being referenced by another process, then as far as the operating system is concerned they are no longer in use following the deallocation of FIG. 4E. Consequently, they are likely to be deleted (garbage collected) from physical memory. This may occur the next time that some space must be freed up in memory to allow new data to be entered into memory, or through some other regular housekeeping process.

Figure 4F:
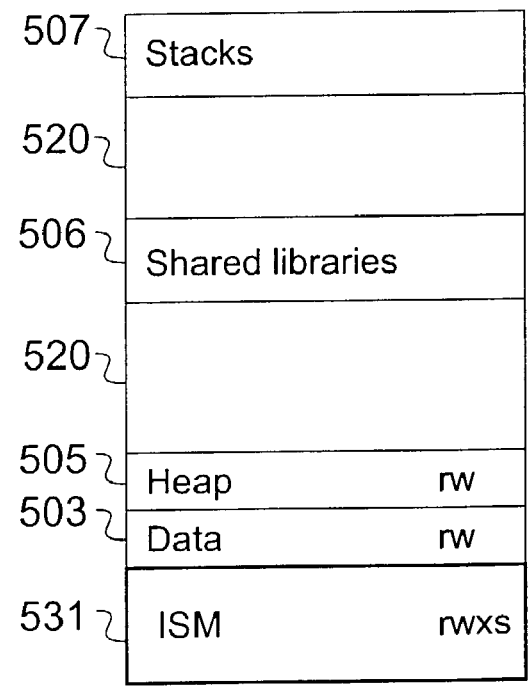

The final part of the process is illustrated in FIG. 4F. Here ISM segment 531 from FIG. 4E has been remapped to the virtual address originally occupied by the program data 501 and associated read-only data 502. This is accomplished by first detaching the ISM segment from its initial virtual address (as shown in FIG. 4C), using the shmdt function, and then re-attaching it to the virtual address space of the process using the shmat function. However, unlike when the ISM segment 531 is first attached to memory in FIG. 4C, where the operating system is allowed to select any suitable free address, this time the operating system is specifically notified in the shmat call of the desired virtual address where the ISM segment should be attached (in other words, effectively at the bottom of the process virtual address space).

The overall effect of the above operation is to restore the process to its operational state, in that the process code and read-only data are now at their initial virtual addresses, albeit within ISM segment 531 rather than their own original addresses. Consequently, when the process reallocation routine from the shared libraries returns, it will find the process code at the expected address, and so can correctly continue.

An important difference however is that whilst the page size for program code 501 and read only data 502 in FIG. 4A was only 8 Kbytes, it has now been increased to 4 Mbytes. This should result in fewer TLB misses, since the TLB will now cover a greater proportion of memory (with the fixed number of page translations that it can hold), and this in turn should lead to improved overall performance.

In addition there are certain side effects due to the fact that the program code and its associated read-only data are now located in ISM, rather than in their original memory segments (as may be detected by certain analysis utilities). Some of these may be regarded as positive. For example, in the present embodiment, ISM memory is locked down, which means that it can't be paged out of memory to external storage, something that will tend to assist the performance of the modified process. In addition, the ISM segment will survive termination of the process, and so is already available with the increased page size the next time that the user runs this code (a check is made to ensure that the code has not been modified in the mean-time).

On the other hand, some of the side effects from using ISM are potentially negative. For example, there is now write permission to ISM segment 531, whereas the original memory segments 501, 502 were read only. If a badly behaved process tried to write to original read only segments 501, 502, this would be automatically detected by the operating system as an error, and notified or processed accordingly. With the configuration of FIG. 4F however, it would appear to the operating system that such an action is permissible, due to the write permission for ISM 531. This could lead to a corruption of the program code and/or read only data, although this would not be immediately detected. Rather, it may cause the program to subsequently crash (for example if an unintelligible instruction is produced), or the error may be more subtle, such as a change to a data value, and only detectable through specific testing.

It should be emphasised that the above dangers only arise from a badly-behaved process, in other words one that is trying to write to a read-only address. The process reallocation of FIGS. 4A–4F will not impact a well-behaved program, other than in the desired sense of increased page size and hence improved performance. Thus one can see such process reallocation as trade-off of improved efficiency against some loss of robustness. Of course, one can take the precaution of initially testing an application without using process reallocation, and then only using this facility once it has been demonstrated that the application is indeed well-behaved (the operating system not having detected any mis-directed write operations).

In fact, there are certain other measures that can be taken to minimise any negative side-effects. For example, access to an ISM segment can be restricted to a single user. Consequently, ISM segment 531 in FIG. 4F can only be corrupted by the process that actually owns that address space, or by another process belonging to the same user. It is not possible for ISM segment 531 to be accessed (and hence potentially corrupted) by any other user. This therefore provides a reasonable degree of security, since it can be expected that a user will take proper responsibility for the processes running under his or her control.

Note that it is not possible to guard against inadvertent updates to ISM segment 531 by removing the "w" permission for this segment. This reason for this is that in the current implementation, such a modification to ISM is not effective. In other words, there is no operating system support for trying to change this default aspect of behaviour for an ISM segment. Nevertheless, it will be appreciated that this limitation (enforced write permission) is quite separate from the paging characteristics of ISM, and it is the latter that are important for the performance benefits. Therefore, it is straightforward to envisage an embodiment in which a segment that provides the desired paging characteristics can be made read only, mirroring the original settings of the program text and read only data areas 501, 502. In such circumstances, the risk of this data being corrupted after the process reallocation has completed can be eliminated.

One implementation detail not so far discussed is that in the present embodiment, ISM can only create 4 Mbyte pages that are aligned with 4 Mbyte boundaries in memory. Consequently, whilst FIG. 4 shows the whole of the process text and read-only data being remapped into ISM, in practice this will only happen for complete 4 Mbyte chunks. In other words, the top and bottom portions of the combined text/read only data will be excluded from the ISM segment, to the extent that they lie outside the closest 4 Mbyte boundary. Rather such portions will retain their original segment mappings, and hence page size.

This situation is particularly likely to arise with the program code segment, since by default in the current embodiment this segment starts at an address of 64 Kbytes (the address space below this is empty, since this region is relatively vulnerable to corruption by the incorrect use of null pointers). Consequently, there is typically nearly 4 Mbytes (less 64 Kbytes) of program code at the bottom of the address space which in general will not be reallocated into the ISM segment.

Note that it is in fact possible to overcome this problem by specifying a particular desired start address for program code, which can then be properly aligned on a 4 Mbyte boundary. However, in the present embodiment, this can only be done at compile/link time (rather than dynamically at run-time).

One can also envisage other methods for addressing this problem. For example, one possibility would be to provide an embodiment in which a segment having a 4 Mbyte page size does not have to start on a 4 Mbyte boundary. Alternatively, as regards the empty address space between 0 and 64 Kbytes, this could in theory be included in an ISM segment starting at zero, and so copied up at step 4D and back again at step 4F with the program text. Unfortunately this latter approach is not in fact supported by the present embodiment, since it does not allow memory segments to be attached at a virtual address of zero, but is certainly feasible in principle.

Figure 5A:
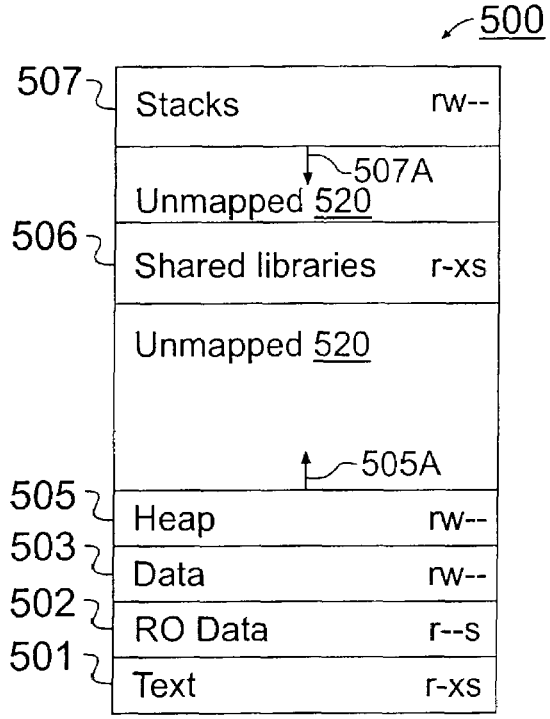
FIGS. 5A through to 5G illustrate the stages involved in reallocating process data into shared memory in accordance with one embodiment of the present invention.
Figure 5B:
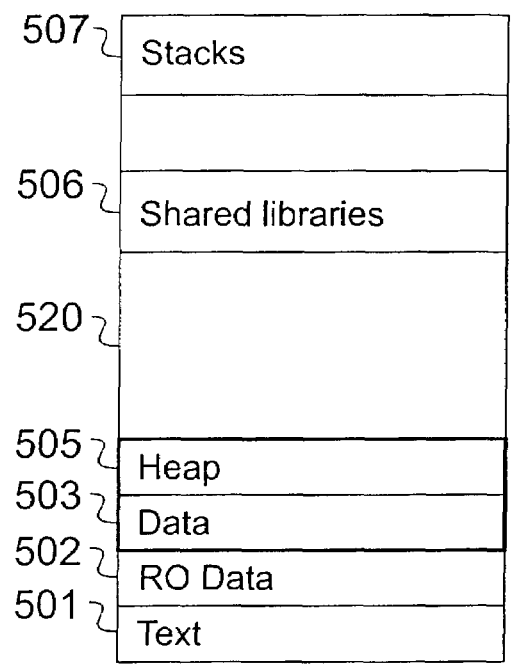

Moving on now to FIGS. 5A through to 5G, these illustrate another example of process reallocation, only this time where the process data rather than the program code is moved. Thus FIG. 5A illustrates the same starting point as FIG. 4A. (The location of the shared libraries has been shifted somewhat in the virtual address compared to FIG. 4A, but this is only for clarity of presentation, and is not otherwise significant). It will also be appreciated that the quantisation to 4 Mbyte boundaries discussed above in relation to FIG. 4 applies similarly to the procedure of FIG. 5, although for simplicity it is not explicitly mentioned below.

Figure 5C:
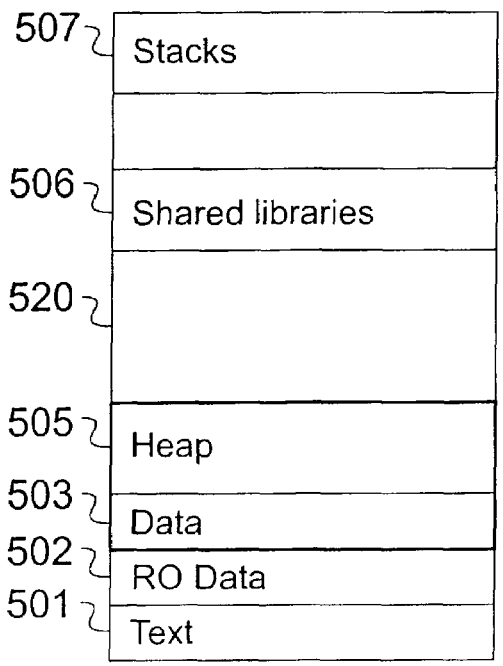

Thus progressing to 5B we see that two different process segments are highlighted: namely data 503 and heap 505. There is one complication here because heap 505 as previously discussed can grow in size. Consequently, when the process is first created the heap starts off much smaller than it is likely to end up. Therefore in order to be able to accommodate future growth of the heap, the process reallocation mechanism causes the heap to be grown at this early stage, as illustrated in FIG. 5C. The heap expansion can be achieved for example by performing a malloc call in C. Note that this is effectively a dummy call, in the sense that no actual data is being written into the heap at this time.

Figure 5D:
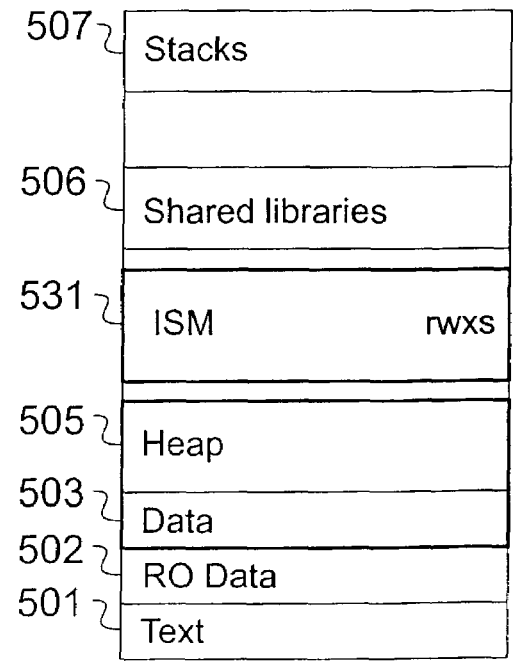

Moving on to FIG. 5D, this shows the creation of ISM segment 531. The mechanism for creating such a segment and its properties have previously been discussed in relation to FIG. 4. ISM segment 531 is slightly smaller than the total address space needed to accommodate data 503 and the (expanded) heap 505. The reason for this will become apparent subsequently.

Figure 5E:
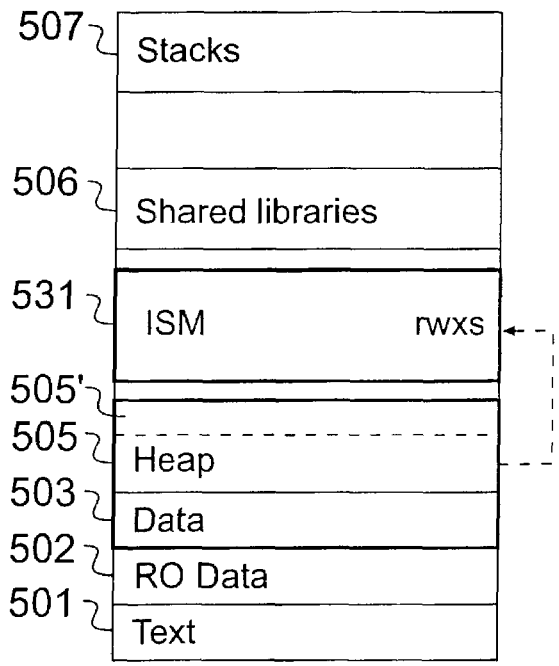

If we now look at FIG. 5E, this illustrates copying of data into the newly created ISM segment 531. More particularly, data is copied from data segment 503 and heap 505 into ISM 531. It will be appreciated that the copy operation itself can be performed as described in relation to FIG. 4, for example by using a bytewise copy.

Note that because of the slight mismatch in size, there is no room in ISM segment 531 for the very top portion of heap 505. In other words, the portion of heap separated by a dashed line in FIG. 5E and denoted as 505A is not copied into segment 531 (as mentioned above, we are ignoring alignment issues at present).

Figure 5F:
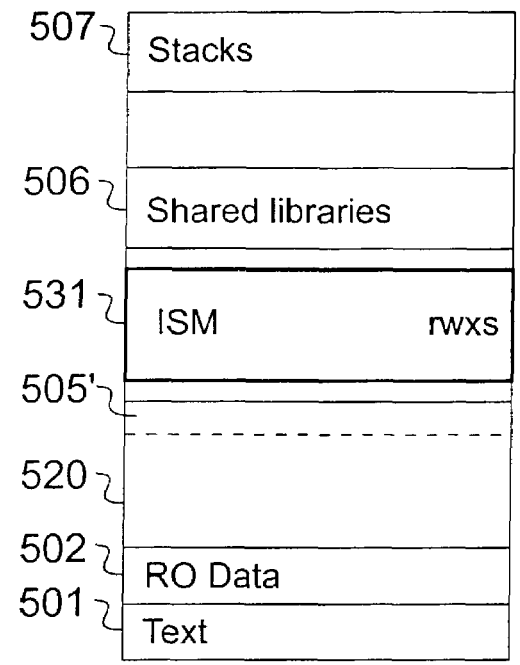

The next stage of the procedure is illustrated in FIG. 5F, which shows that those portions of process data that have been copied into ISM segment 531 have now been unmapped from the virtual address space of this process, and returned to unallocated region 520. This is true in particular for data segment 503 and most of the heap 505. It will be noted however that heap region 505A, which was not copied into ISM segment 531, is not unmapped. In other words heap section 505A is retained in its original position in the process address space.

As observed in relation to the corresponding stage in FIG. 4 (see especially FIG. 4E), the process is now in a somewhat precarious state. Thus if the program were to attempt to run, and to access some variable data supposedly stored in data segment 503, the process would be unable to locate such data and would therefore fail.

Figure 5G:
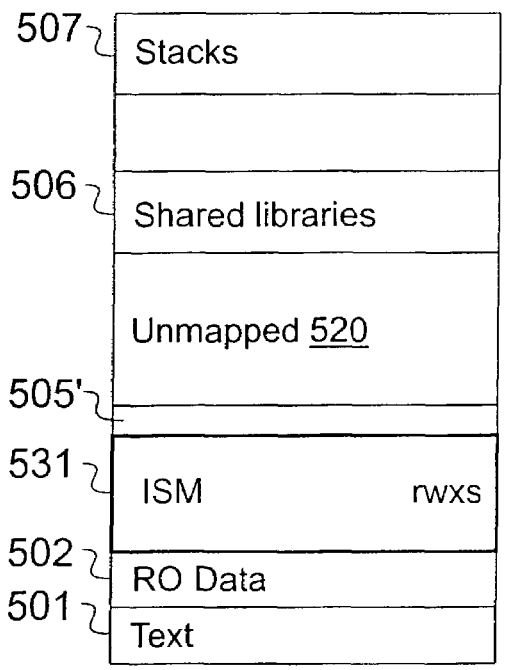

The process is returned to an operational state by the concluding stage of the process reallocation, as illustrated in FIG. 5G. Analogous to the steps performed in FIG. 4, ISM segment 531 is now detached from its initial location in virtual address space, and re-attached at the virtual address corresponding to the original position of data segment 503 and heap 505. Thus the contents of the process virtual address space in terms of the actual bytes have been restored to the situation of FIG. 5A. However, whilst these contents were originally stored in data segment 503 and heap 505, they are now stored in ISM segment 531. Consequently these contents are now being manipulated by the operating system with a 4 megabyte page size, therefore significantly reducing the likelihood of a TLB miss. This in turn will improve overall system performance.

The exception to this reallocation is the topmost portion of heap 505 (i.e., portion 505A), which has remained in its original segment. The reason for this is that the operating system treats a heap segment in a special way that allows it to grow as required. In contrast, the default segment behaviour as provided by the operating system does not provide the ISM segment with this facility to expand.

Thus by retaining the top portion of heap 505A in its native form, the heap retains the ability to grow correctly as required to satisfy memory requests, since the heap boundary is still within a heap segment, and so can be handled by normal operating system facilities for growing the heap (remembering of course that, as previously stated, the heap always grows upwards into address space). This therefore avoids the need for any further modification of or interference with the operating system.

In fact, the artificial increase in heap size produced in FIG. 5C reduces the likelihood that the heap will actually need to grow in the future, since it is already larger than at the time of initial creation. The impact of this is that hopefully most, if not all, of the heap that is actually used by the process will be included within the ISM segment, and therefore subject to 4 Mbyte page operations. This in turn should help to optimise the gain in performance efficiency.

As described in relation to FIG. 4, the use of an ISM segment within the process virtual address space does have certain side effects. In particular, it will be noted that ISM comes automatically (as its name would suggest) with a "s" (share) permission that cannot be removed. Consequently it is possible for the data of one process, as reallocated to an ISM segment with both "w" and "s" permissions, to be corrupted by another process.

Again, as already discussed as regards FIG. 4, such corruption should not be a danger for well-behaved processes, since they will only access data within their own virtual address space. In addition, exposure to badly behaved processes can be limited by restricting ISM segment 531 to those processes that belong to the same user as the process that owns this virtual address space. Thus a user has full control over the operations that may affect the address space of FIG. 5G, and accordingly the risk of any unexpected behaviour is minimised.

There is however one important caveat to the above comments as regards the use of ISM segment 531. This relates to the fork command in UNIX where a parent process creates a child process. The child process is an exact copy of the parent process but with a different process ID. In a UNIX fork operation there is no immediate creation of new data structures for the child process, but rather for reasons of economy it continues to use the structures of the parent process as much as possible. For example, the child process uses the text (i.e. program code) segment 501 and read only data segment 502 of the parent process. Since these are both already marked for sharing, and should be treated as read only, this does not cause any problem for the process reallocation of a well-behaved application. In other words a fork operation can still be performed without problem after the pre-process reallocation of FIG. 4.

However, the situation is slightly different if the process reallocation moves data rather than code, as illustrated in FIG. 5. Thus in normal circumstances when a fork is encountered, data segment 503 and heap 505 are not marked as shared. Nevertheless, rather than immediately duplicating them, so that the parent and child processes can each have their own copy, the operating system instead marks the pages in these two segments as copy-on-write. Consequently, the child process is allowed to continue to read from the segments of its parent process. However, if either the child or the parent tries to write back to a page in one of these segments, the operating system knows that it must create (write) a fresh copy of the page for the child process, otherwise the page storing the data for the parent process will be modified (i.e. corrupted as far as the process that did not write the data is concerned).

Unfortunately this copy-on-write process is not invoked if the process reallocation mechanism of FIG. 5 has been implemented. The reason for this is that ISM segment 531 is, unavoidably, marked as shared. Thus it appears to the operating system as if it is quite acceptable for a child process to access ISM segment 531 belonging to its parent process in view of the "s" (share) permission for this segment (a child process will of course belong to the same user as its parent process).

The result of this is that the child and parent process are now unintentionally sharing and writing to the same data segment. For example, the parent process may utilise the value of a particular data variable without realising that this variable has just been modified or set to some other value by the child process.

It will be appreciated that this susceptibility to error is well-defined, which means that in practice it is relatively straightforward to avoid. The simplest approach is just to prevent a process reallocation being performed in respect of any process which utilises a fork operation. However, more sophisticated strategies are also possible, which can attempt to preserve the performance benefits of process reallocation in certain other circumstances.

One such possibility is to look in more detail at the operations immediately following a fork operation. Thus the UNIX environment does not provide any specific ability for one process to spawn a separate process. Therefore an equivalent result is sometimes achieved by forking a child process from a parent, and then simply using the child to call exec( ). This then initiates a quite different process from the parent process.

Such behaviour will generally not cause a problem for process reallocation, since the fork operation here is effectively being used to produce a completely new process, which will have its own set of code and data variables. Consequently, the data of the parent process will not be reused by the child process and so there is no danger of corruption.

A somewhat more complex workaround for the process reallocation of FIG. 5 in the event of a fork is for the process reallocation itself to take preventative measures. This can involve supplanting the normal fork process provided by the operating system environment with one that detects the presence of an ISM segment as created herein within a forked process. The data in this segment can then be duplicated, before proceeding with the normal fork operation in the libc library (for a standard UNIX environment). Once the child has been created, the modified fork can reacquire control, and duplicated data is remapped into the desired virtual address space for the child process. This eliminates any future sharing of the data between the child and parent processes, allowing them both to proceed normally.

Although the process reallocation procedure described so far has involved the separate moving of program code (as in FIG. 4) and program data (as in FIG. 5), it will be appreciated that it is quite possible to utilise this process in relation to all four process segments at the same time. In other words program text 501, read-only data 502, data 503, and heap 505, can all be copied together into an ISM segment 531 and then returned to their original location within the virtual address space. This complete process reallocation provides the maximum benefit in terms of paging efficiency and hence overall system performance gain, but remains vulnerable to the potential problems on forking described in relation to FIG. 5.

In practice, it would generally be advantageous to perform the reallocations of FIGS. 4 and 5 into separate ISM memory segments, even when both remappings were performed on the same process. The reason for this is that it is permissible for well-behaved processes to re-use the same ISM segment containing (read-only) code, but not, for data consistency reasons, the same read/write data area. Having these in separate ISM segments therefore allows the program designer to re-use code text within different processes in one ISM segment, whilst also allowing each process its own private ISM segment for data purposes. (N.B. Here "private" implies that the program designer will only use the ISM segment from within one process, even although as previously explained it is not possible to stop a (badly behaved) process owned by the same user writing into such an ISM segment).

Another possibility is that the process reallocation procedure can also be applied to a shared library, typically one that is relatively large and performance-sensitive. Thus although not shown in FIG. 4 or 5, each shared library has its own code and data regions, analogous to the illustrated main segments for a process. The above process reallocation procedure can then be applied to the shared library, if it is desired to change the page size used by the system in relation to the library.

Figure 6A:
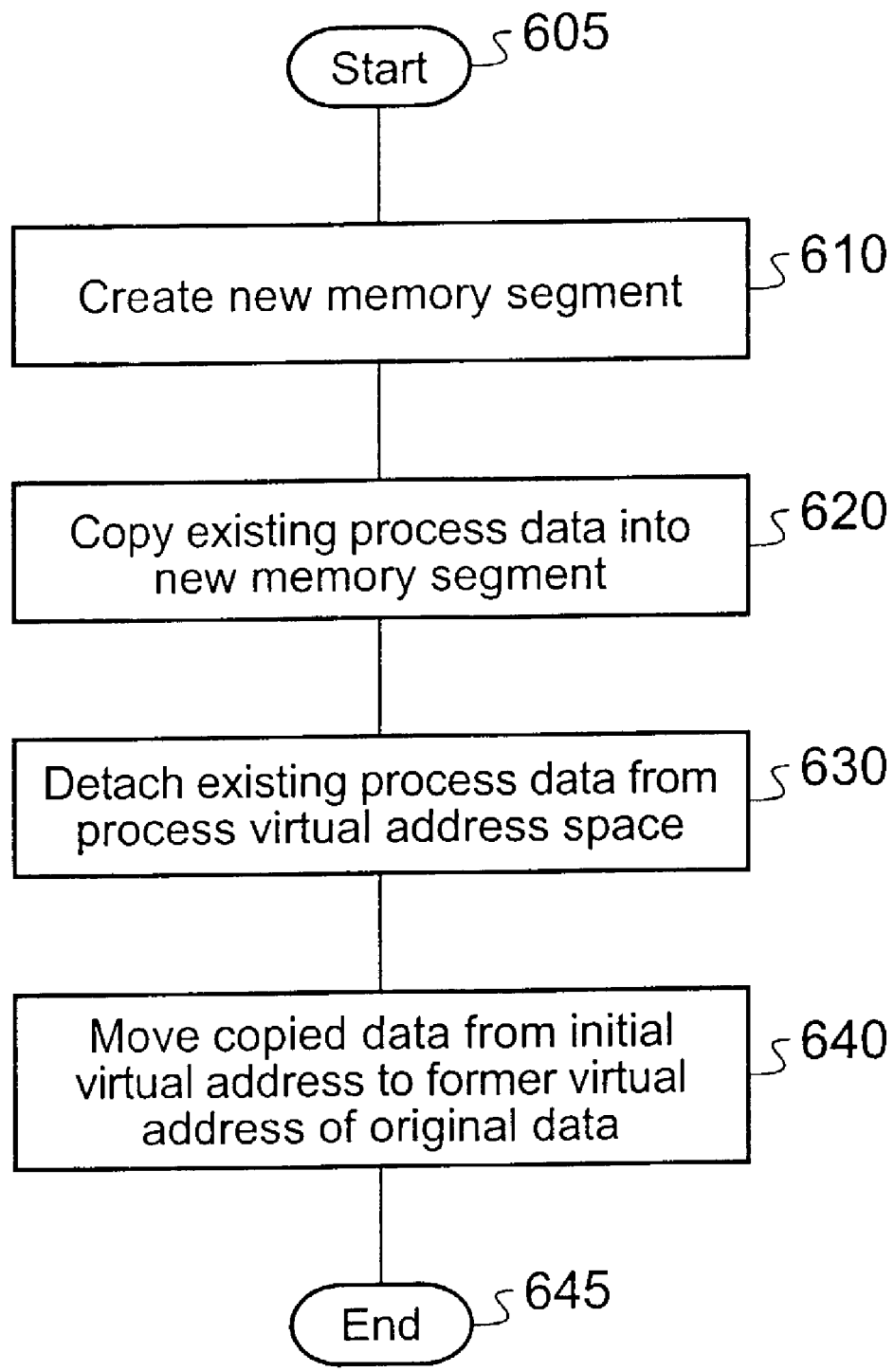
FIGS. 6A and 6B are flowcharts illustrating the main steps involved in reallocating process data in two different embodiments of the invention.

FIG. 6A provides a flowchart summarising the main steps performed during the process reallocation schemes illustrated in FIGS. 4 and 5. Thus the method starts at step 605, where it is assumed that the process to be reallocated is quiescent (either because it has not yet started, or because its normal operation is somehow suspended). The method proceeds to step 610, in which a new memory segment is created in the process virtual address space. Next, at step 620, (selected) existing process code and/or data is copied into the newly created segment. Then at step 630, the original existing process code and/or data (or more accurately the portion of it copied at step 620) is detached from the virtual address space of the process. Finally, at step 640, the virtual address of the copied data is altered so that it is moved into the virtual address space from which the original data has just been detached, thereby reconstituting the process, and allowing the method to conclude at step 645.

Figure 6B:
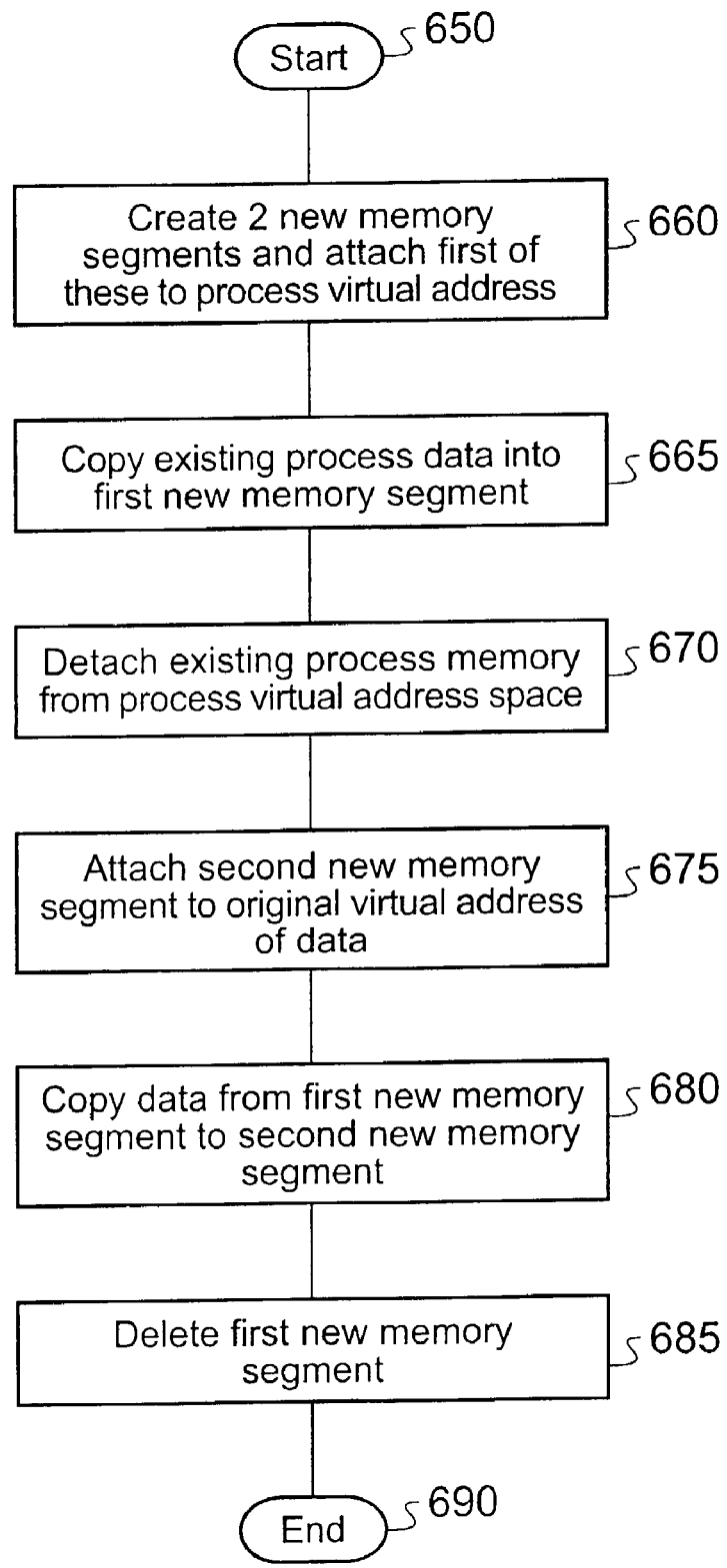

FIG. 6B provides a flowchart whereby process reallocation can be accomplished by a slight different route from the utilised in FIG. 6A. This embodiment is especially applicable in environments which do not permit remapping of physical memory from virtual address to another (i.e. step 640 of FIG. 6A).

Thus starting at step 650 in FIG. 6B, the method creates two new memory segments. The page characteristics of the first of these is not important, but the page characteristics of the second should be as desired for final operation of the process (in the current embodiment this means that only the second new segment need be an SM segment). The first new memory segment is now attached to the virtual address of the process to be copied, but not the second.

Proceeding to step 665, the process code and/or data (as desired) is copied from its original location into the first new memory segment, after which the memory region that contained this code and/or data is detached from the virtual address space of the process (step 670). The second new memory segment is now attached to this newly vacated virtual address space (step 675). Next the data from the first new memory segment can be copied into the second new memory segment (step 680), thereby effectively restoring the process to its original location, albeit with the modified page characteristics of the second new memory segment.

Thus in this embodiment the first new memory segment is effectively acting simply as a temporary store. Therefore, when the process has been reconstituted at step 680, the first new memory segment is no longer required, and so can be deleted (step 685), after which the method concludes (step 690).

As already mentioned, the process reallocation mechanism illustrated in FIGS. 4–6 is implemented as a shared library in a current embodiment. More particularly, when an application is run in this embodiment, an environment variable can be set using the LD_PRELOAD command. This command then references the process reallocation shared library, which a result is dynamically linked into the application at run-time.

The use of the LD_PRELOAD command forces the linking of the process reallocation shared library to occur immediately the process is launched. Moreover, this shared library uses the init call to ensure that the process reallocation code is run as soon as the linking occurs. The overall effect of this is that the process reallocation is performed prior to any execution of the application program code itself. This ensures that there are no problems when the process code itself is (temporarily) deleted, as in FIG. 4E, given that the main process code has not yet commenced.

Note that this early invocation of the process reallocation mechanism means that it is not possible for an individual process to override it by resetting the environment variable from within the process, since the mechanism has already been called before such resetting can become effective (although a user could of course reset the environment variable before launching the process in the first place). However, it is possible to reset the environment variable before launching a child process, so this provides a strategy if desired for permitting only selective utilisation of the mechanism.

In addition, it is possible to perform the process reallocation during actual running of an application program. In this case, the process should first be quiesced for two reasons. Firstly, this avoids the possibility of any active reference being made to a process segment that is temporarily removed during the reallocation procedure. Secondly, quiescing the process allows a proper snapshot of it to be taken when the copying operation of FIG. 4D or 5E is performed. As used herein, the term "quiescing" means making something (e.g., a process) temporarily inactive, suspended, or disabled.

In the current embodiment, a mechanism for performing process reallocation once a process is already in operation is to set the LD_AUDIT environment variable (this is a standard instrumentation feature provided by the operating system). This facility passes control to a specified event handler when a target process first makes a designated library function call. This break could then be used to launch the process reallocation code. One limitation of this technique however is that it does not suspend other threads belonging to the process, so it would be difficult to use properly with multi-threaded code.

Another possible mechanism is to use some form of debugging interface. Thus certain operating systems provide the facility to suspend a process (including all of its threads) for debugging or diagnostic purposes, and process reallocation could be performed during this period of suspension.

An important aspect of the above techniques is that they can be utilised without modification to the operating system or application program itself. This is advantageous, because the user may frequently be unable or unwilling to modify the operating system or application program (for example, if they have been obtained or developed by a third party supplier).

On the other hand, in certain circumstances, it may be the application program owner or developer who wants to exploit process reallocation, and in this case the page sizing mechanism can be incorporated into the application program itself. The most convenient way of doing this is to again incorporate the routine into a shared library rather than in the main body of application code, since this avoids the danger of trying to reallocate code that is actually being executed. Note that in this situation it would be the responsibility of the application to ensure that the process was suitably quiescent before the reallocation procedure commenced.

Although the above embodiment has focussed on process reallocation in order to (partially) alter the page size assigned by the system to a process, it will be appreciated that there can be other reasons for wanting to manipulate a process in this manner. For example, in machines supporting a non-uniform memory architecture (NUMA), where there are multiple processors and memories, the access time (latency) from any given processor to a memory will vary according to their relative location within the machine. The differences can be quite significant, for example from 100 ns to 1000 ns. Consequently, the performance of a program running on a processor can be significantly impacted according to whether the program code is stored on a memory that is local or remote (relatively speaking) for that processor.

Normally, the system will of course store program code and data close to the relevant processor, but let us consider the situation where a program is initially run on processor A. Now, if the same program is launched on processor B, the standard facility for sharing code allows processor B to use the same copy of the code as processor A. Unfortunately however, whilst this code may be stored locally for processor A, it may be remote from processor B, and therefore result in poor performance on processor B.

This situation can be rectified by using the process reallocation mechanism described herein to copy the program code to a local memory location (for processor B). Since the program code is read only, the existence of this additional copy does not lead to any consistency problems (likewise it is feasible for process read only data to be copied over). Once again, the mechanism is, within the address space of the process running on processor B, to copy the code from its original location to a new (local) memory location. The original (remote) copy of the code can then be unmapped from this process address space, and replaced at its initial location by the (local) copied code. Altering page location in this manner, so that code is brought as close as possible to processor B, can provide potentially significant performance benefits.

It will be appreciated that when using process reallocation to modify page location, it is not necessary to use an ISM segment as the target location for copying the process code and/or data. This is because unlike for page size, this property can be changed for segment types other than ISM. Consequently, some of the potential difficulties discussed earlier in relation to process reallocation (such as badly behaved applications, and handling process forks) cease to be problematic. This is memory segments can be used when changing page colour or data that allow the reconstituted process to match the permissions of the original—i.e. no writing to read only code or data, and no sharing of read/write data. Conversely, it may well be possible in embodiments based on future versions of the Solaris operating system that some of the current segment restrictions will be relaxed, for example to allow certain segments other than ISM to have a different page size, or to permit the withdrawal of write permission from ISM segments.

In conclusion a process reallocation mechanism has been described that enables a user to alter the page and/or paging characteristics originally assigned to a process by the operating system, without having to change these characteristics on a system-wide basis. Although particular embodiments have been discussed in detail that support this facility, it will be appreciated that there are many further potential variations and modifications of these which will be apparent to the skilled person, and which will remain within the scope of the claimed invention and its equivalents.

What is claimed is:

1. A method of operating a computer system supporting virtual memory and a paging mechanism, said method comprising the steps of:
   creating a process in memory, said process including at least one component in a first pageable memory region having a first paging characteristic, said first memory region being located at a first virtual address, wherein said first memory region comprises one or more memory segments, wherein the first memory region comprises a process heap segment;
   expanding the heap segment;
   making a copy in virtual memory of said at least one component at a virtual address different from said first virtual address after said expanding the heap segment;
   retaining a portion of the heap in said first memory region having the first paging characteristic; and
   replacing the first memory region at the first virtual address with a second pageable memory region having a second paging characteristic, wherein said second memory region comprises one or more memory segments;
   wherein said copy of the at least one component is stored in the second memory region having the second paging characteristic.

2. The method of claim 1, wherein the step of making a copy of said at least one component comprises copying said at least one component into said second memory region.

3. The method of claim 2, further comprising the step of attaching the second memory region to a second virtual address of the process prior to performing said copying step, and wherein said step of replacing the first memory region at the first virtual address with the second memory region comprises the steps of detaching the second memory region from said second virtual address and attaching the second memory region to said first virtual address.

4. The method of claim 1, wherein the step of making a copy of said at least one component comprises copying said at least one component into a third memory region having a virtual address different from said first virtual address, and said method further comprises the step of duplicating said at least one component from the third memory region into the second memory region after performing the step of replacing the first memory region at the first virtual address with the second memory region.

5. The method of claim 4, further comprising the step of deleting the third memory region after performing said duplicating step.

6. The method of claim 1, wherein said step of replacing includes the step of detaching the first memory region from said first virtual address.

7. The method of claim 1, wherein said first paging characteristic represents a first page size.

8. The method of claim 7, wherein said second paging characteristic represents a second page size, whereby said second page size is substantially larger than said first page size.

9. The method of claim 1, wherein a the first memory region comprises a process text segment.

10. The method of claim 1, wherein the first memory region comprises a process data segment.

11. The method of claim 1, wherein said steps of making a copy and replacing the first memory region are performed prior to execution of the main body of process code itself.

12. The method of claim 11, wherein said steps of making a copy and replacing the first memory region are implemented by calling a shared library which is dynamically linked to said process at run-time.

13. The method of any of claim 1, further comprising the step of quiescing the process prior to performing the steps of making a copy and replacing the first memory region.

14. A computer system supporting virtual memory and a paging mechanism, and including:
   means for creating a process in memory, said process including at least one component in a first pageable memory region having a first paging characteristic, said first memory region being located at a first virtual address, wherein said first memory region comprises one or more memory segments, wherein the first memory region comprises a process heap segment;
   means for expanding the heap segment;
   means for making a copy in virtual memory of said at least one component at a virtual address different from said first virtual address after expanding the heap segment;
   means for retaining a portion of the heap in said first memory region having the first paging characteristic; and means for replacing the first memory region at the first virtual address with a second pageable memory region having a second paging characteristic, wherein said second memory region comprises one or more memory segments;

wherein said copy of the at least one component is stored in the second memory region having the second paging characteristic.

15. The computer system of claim 14, wherein the means for making a copy includes means for copying said at least one component into said second memory region.

16. The computer system of claim 15, further comprising means for attaching the second memory region to a second virtual address of the process prior to performing said copying, and wherein said means for replacing the first memory region at the first virtual address with the second memory region comprises the means for detaching the second memory region from said second virtual address and means for attaching the second memory region to said first virtual address.

17. The computer system of claim 14, wherein the means for making a copy of said at least one component comprises means for copying said at least one component into a third memory region having a virtual address different from said first virtual address, and said computer system further comprises means for duplicating said at least one component from the third memory region into the second memory region after replacing the first memory region at the first virtual address with the second memory region.

18. The computer system of claim 17, further comprising the means for deleting the third memory region after said duplicating.

19. The computer system of claim 14, wherein said means for replacing includes means for detaching the first memory region from said first virtual address.

20. The computer system of claim 14, wherein said first paging characteristic represents a first page size.

21. The computer system of claim 20, wherein said second paging characteristic represents a second page size, whereby said second page size is substantially larger than said first page size.

22. The computer system of claim 14, wherein the first memory region comprises a process text segment.

23. The computer system of claim 14, wherein the first memory region comprises a process data segment.

24. The computer system of claim 14, wherein said means for making a copy and means for replacing the first memory region are operative prior to execution of the main body of process code itself.

25. The computer system of claim 24, wherein said means for making a copy and means for replacing the first memory region are implemented by calling a shared library which is dynamically linked to said process at run-time.

26. The computer system of claim 14, further comprising means for quiescing the process prior to making a copy and replacing the first memory region.

27. A computer program product comprising instructions in machine readable form on a storage medium, said instructions when loaded into a computer system supporting virtual memory and a paging mechanism operable to make the system perform a method comprising the steps of:

creating a process in memory, said process including at least one component in a first pageable memory region having a first paging characteristic, said first memory region being located at a first virtual address, wherein said first memory region comprises one or more memory segments, wherein the first memory region comprises a process heap segment;

expanding the heap segment;

making a copy in virtual memory of said at least one component at a virtual address different from said first virtual address after said expanding the heap segment;

retaining a portion of the heap in said first memory region having the first paging characteristic; and replacing the first memory region at the first virtual address with a second pageable memory region having a second paging characteristic, wherein said second memory region comprises one or more memory segments;

wherein said copy of the at least one component is stored in the second memory region having the second paging characteristic.

28. The computer program product of claim 27, wherein the step of making a copy of said at least one component comprises copying said at least one component into said second memory region.

29. The computer program product of claim 28, further comprising instructions operable to make the computer perform the step of attaching the second memory region to a second virtual address of the process prior to performing said copying step, and wherein said step of replacing the first memory region at the first virtual address with the second memory region comprises the steps of detaching the second memory region from said second virtual address and attaching the second memory region to said first virtual address.

30. The computer program product of claim 27, wherein the step of making a copy of said at least one component comprises copying said at least one component into a third memory region having a virtual address different from said first virtual address, and said computer program product further comprises instructions operable to make the computer perform the step of duplicating said at least one component from the third memory region into the second memory region after performing the step of replacing the first memory region at the first virtual address with the second memory region.

31. The computer program product of claim 30, further comprising instructions operable to make the computer perform the step of deleting the third memory region after performing said duplicating step.

32. The computer program product of claim 27, wherein said step of replacing includes the step of detaching the first memory region from said first virtual address.

33. The computer program product of claim 27, wherein said first paging characteristic represents a first page size.

34. The computer program product of claim 33, wherein said second paging characteristic represents a second page size, whereby said second page size is substantially larger than said first page size.

35. The computer program product of claim 27, wherein the first memory region comprises a process text segment.

36. The computer program product of claim 27, wherein the first memory region comprises a process data segment.

37. The computer program product of claim 27, wherein said steps of making a copy and replacing the first memory region are performed prior to execution of the main body of process code itself.

38. The computer program product of claim 37, wherein said steps of making a copy and replacing the first memory region are implemented by calling a shared library which is dynamically linked to said process at run-time.

39. The computer program product of claim 27, further comprising instructions operable to make the computer perform the step of quiescing the process prior to performing the steps of making a copy and replacing the first memory region.

40. A computer system supporting virtual memory and a paging mechanism, and comprising:
- a process including at least one component in a first pageable memory region having a first paging characteristic, said first memory region being located at a first virtual address and comprising a process heap segment;
- a duplication routine for application to said at least one component to make a copy in virtual memory of said at least one component at a virtual address different from said first virtual address, wherein the copy is made after expanding the process heap segment; and
- a second pageable memory region having a second paging characteristic;
- wherein the first memory region at the first virtual address is replaced with said second memory region, wherein said copy of the at least one component is stored in the second memory region having the second paging characteristic, and wherein a portion of the process heap segment is retained in the first memory region having the first paging characteristic.

41. A method of operating a computer system supporting virtual memory and a paging mechanism, said method comprising the steps of:
- creating a process in memory, said process including at least one component in a first pageable memory region having a first paging characteristic, said first memory region being located at a first virtual address and comprising a process heap segment;
- expanding the process heap segment;
- copying said at least one component from said first memory region into a second pageable memory region having a second paging characteristic, thereby making a copy of said at least one component in virtual memory at a virtual address different from said first virtual address; and
- reallocating the second memory region in virtual memory so that it replaces the first memory region at said first virtual address while retaining the second paging characteristic, wherein a portion of the process heap segment is retained in the first memory region having the first paging characteristic.

42. A method of operating a computer system having at least first and second processors and a non-uniform memory architecture, and supporting virtual memory and a paging mechanism, said method comprising the steps of:
- storing process code for the first processor in a first pageable memory region comprising a process heap segment;
- expanding the process heap segment;
- making a copy in virtual memory of said process code in a second pageable memory region;
- replacing the first memory region for the second processor with the second memory region at the same virtual address;
- wherein said first and second memory regions have different latencies from the perspective of the second processor, and wherein a portion of the process heap segment is retained in the first memory region having the first paging characteristic.

43. A computer system having at least first and second processors and a non-uniform memory architecture, and supporting virtual memory and a paging mechanism, said system comprising:
- means for storing process code for the first processor in a first pageable memory region comprising a process heap segment;
- means for expanding the process heap segment;
- means for making a copy in virtual memory of said process code in a second pageable memory region; and
- means for replacing the first memory region for the second processor with the second memory region at the same virtual address;
- wherein said first and second memory regions have different latencies from the perspective of the second processor, and wherein a portion of the process heap segment is retained in the first memory region having the first paging characteristic.

44. A computer program product comprising instructions in machine readable form on a storage medium, said instructions when loaded into a computer system having at least first and second processors and a non-uniform memory architecture, and supporting virtual memory and a paging mechanism, operable to cause the system to perform the steps of:
- storing process code for the first processor in a first pageable memory region comprising a process heap segment;
- expanding the process heap segment;
- making a copy in virtual memory of said process code in a second pageable memory region;
- replacing the first memory for the second processor with the second memory region at the same virtual address;
- wherein said first and second memory regions have different latencies from the perspective of the second processor, and wherein a portion of the process heap segment is retained in the first memory region having the first paging characteristic.

* * * * *